(12) United States Patent  
Elias et al.

(10) Patent No.: US 8,849,480 B2  
(45) Date of Patent: Sep. 30, 2014

(54) AIRCRAFT GROSS WEIGHT AND CENTER OF GRAVITY VALIDATOR

(71) Applicant: Honeywell International Inc., Morristown, NJ (US)

(72) Inventors: Frank Rajkumar Elias, Bangalore, IN (US); Visvanathan Thanigai Nathan, Bangalore, IN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/781,961

(22) Filed: Mar. 1, 2013

(65) Prior Publication Data

US 2014/0249700 A1  Sep. 4, 2014

(51) Int. Cl.
```
G06F 7/70       (2006.01)
B64D 31/00      (2006.01)
B64D 45/00      (2006.01)
```

(52) U.S. Cl.
CPC .............. *B64D 45/00* (2013.01); *B64D 31/00* (2013.01)
USPC .......................................................... 701/14

(58) Field of Classification Search
CPC ............................. G01C 23/00; G08G 5/0021
USPC ................... 701/14, 3, 15, 124; 340/945, 959
See application file for complete search history.

(56) References Cited

U.S. PATENT DOCUMENTS

| | | |
|---|---|---|
| 3,701,279 A | 10/1972 | Harris et al. |
| 4,949,269 A | 8/1990 | Buisson et al. |
| 5,239,137 A | 8/1993 | Patzig |
| 6,657,334 B1 | 12/2003 | Edelson |
| 6,831,430 B2 | 12/2004 | Edelson |
| 2006/0243855 A1 | 11/2006 | Pradier |

(Continued)

FOREIGN PATENT DOCUMENTS

| | | |
|---|---|---|
| WO | 2005035358 | 4/2005 |
| WO | 2005112584 | 12/2005 |

(Continued)

OTHER PUBLICATIONS

"Print from Airliners.net discussion forum: How Does an Aircraft Weigh Itself?", "http://www.airliners.net/aviation-forums/tech_ops/read.main/256650/", Jun. 13, 2009, pp. 1-7.

(Continued)

*Primary Examiner* — Thomas G Black
*Assistant Examiner* — Luke Huynh
(74) *Attorney, Agent, or Firm* — Fogg & Powers LLC

(57) ABSTRACT

A system for validating ground determination of gross weight of aircraft includes sensor(s) that generates information regarding ground determination of gross weight while parked at parking bay; processing device that receives information regarding ground determination of gross weight of the aircraft from sensor(s); and computer memory communicatively coupled to processing device. Processing device determines ground determination based on information regarding ground determination of gross weight generated by sensor. Processing device determines gross weight in air after takeoff based on indicated airspeed, angle of attack, and thrust applied to aircraft. Processing device determines error between ground determination and air determination of gross weight taking into account reduction in gross weight due to fuel consumed since receiving ground determination. Processing device updates information regarding relationship between ground determination and air determination of gross weight. Computer memory stores updated information regarding relationship for use next time aircraft parks at parking bay.

20 Claims, 6 Drawing Sheets

(56) References Cited

U.S. PATENT DOCUMENTS

| | | |
|---|---|---|
| 2006/0273686 A1 | 12/2006 | Edelson et al. |
| 2007/0012106 A1 | 1/2007 | Mardirossian |
| 2007/0288130 A1 | 12/2007 | Lemoult et al. |
| 2008/0065352 A1 | 3/2008 | Coulmeau |
| 2008/0312870 A1 | 12/2008 | Cox et al. |
| 2010/0100260 A1* | 4/2010 | McIntyre et al. .................. 701/6 |

FOREIGN PATENT DOCUMENTS

| | | |
|---|---|---|
| WO | 2006002207 | 1/2006 |
| WO | 2006065988 | 6/2006 |
| WO | 2006078322 | 7/2006 |
| WO | 2006113121 | 10/2006 |
| WO | 2007006310 | 1/2007 |

OTHER PUBLICATIONS

European Patent Office, "Office Action from EP Application No. 14156662.0 mailed Jun. 30, 2014", "from Foreign Counterpart of U.S. Appl. No. 13/781,961", Jun. 30, 2014, pp. 1-6, Published in: EP.

European Patent Office, "European Search Report from EP Application No. 14156662.0 mailed Jun. 17, 2014", "from Foreign Counterpart of U.S. Appl. No. 13/781,961", Jun. 17, 2014, pp. 1-3, Published in: EP.

* cited by examiner

AIRCRAFT GROSS WEIGHT AND CENTER OF GRAVITY VALIDATOR

BACKGROUND

Incorrect entry of aircraft gross weight (GW) and/or center of gravity (CG) in a Flight Management System (FMS) and/or an Electronic Flight Bag (EFB) and consequent incorrect pitch trim settings on the flight controls Trimable Horizontal Stabilizer (THS) in the cockpit at the commencement of a flight, can potentially result in a dangerously "out of trim" aircraft if an engine fails. The incorrect entry of the gross weight and/or center of gravity and consequent incorrect pitch trim settings at the commencement of a flight lead to situations that are hazardous during takeoff, such as slow acceleration, low takeoff speeds that increase the risk of tail strikes and over running of the runway with consequent unintended contact with the ground. Accidents resulting from incorrect entry of aircraft gross weight and/or center of gravity have occurred during takeoff, resulting in damage to aircraft, expensive repairs, grounding of aircraft and the danger to passengers and crew that were exposed to the accident.

Current methods address this problem by computing the gross weight and center of gravity (CG) at door closing time by adding various sensors at certain points on the landing gear of the aircraft. This problem of accuracy is addressed by embodiments described herein.

SUMMARY

A system for validating a ground determination of a gross weight of an aircraft includes at least one sensor configured to generate information regarding a ground determination of gross weight of an aircraft while parked at an aircraft parking bay on the ground before takeoff; at least one processing device communicatively coupled to the at least one sensor and configured to receive the information regarding the ground determination of the gross weight of the aircraft while parked at the aircraft parking bay on the ground before takeoff from the at least one sensor; and at least one computer memory communicatively coupled to the at least one processing device. The at least one processing device is configured to determine the ground determination of the gross weight of the aircraft while parked at the aircraft parking bay on the ground before takeoff based on the information regarding the ground determination of gross weight of the aircraft while parked at the aircraft parking bay on the ground before takeoff generated by the at least one sensor. The at least one processing device is further configured to determine the gross weight of the aircraft in the air after takeoff based on an indicated airspeed of the aircraft, an angle of attack of the aircraft, and thrust applied to the aircraft. The at least one processing device is further configured to determine a first error between the ground determination of the gross weight of the aircraft while parked at the aircraft parking bay on the ground and the air determination of gross weight of the aircraft while in the air while taking into account any reduction in gross weight of the aircraft due to fuel consumed since receiving the ground determination of the gross weight of the aircraft parked at the aircraft parking bay on the ground. The at least one processing device is further configured to update information regarding a relationship between the ground determination of the gross weight of the aircraft while parked at the aircraft parking bay on the ground and the air determination of gross weight of the aircraft while in the air. The at least one computer memory is configured to store the updated information regarding the relationship for use next time the aircraft parks at the aircraft parking bay on the ground.

DRAWINGS

Understanding that the drawings depict only exemplary embodiments and are not therefore to be considered limiting in scope, the exemplary embodiments will be described with additional specificity and detail through the use of the accompanying drawings, in which.

Figure 4:
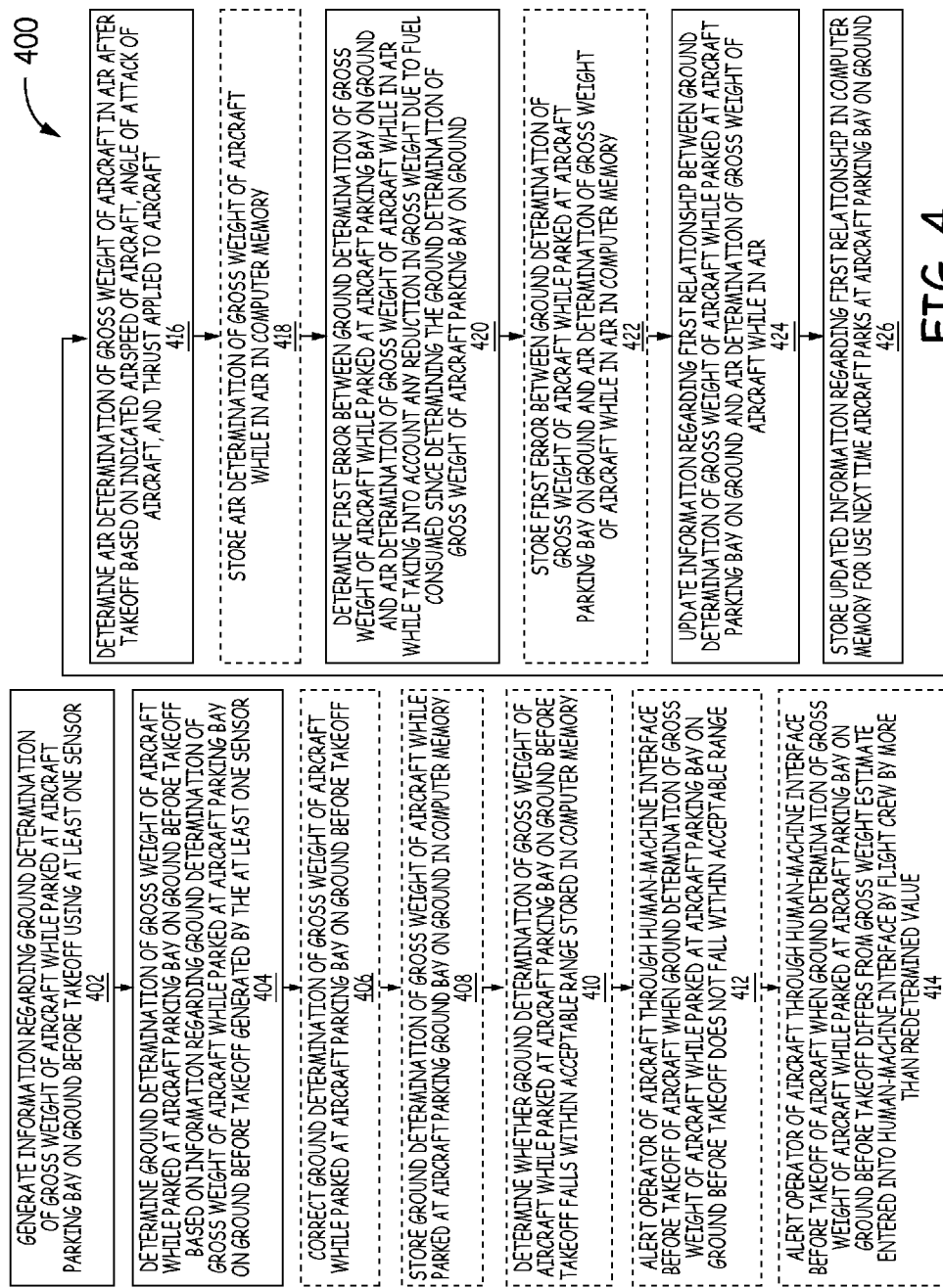
Figure 5:
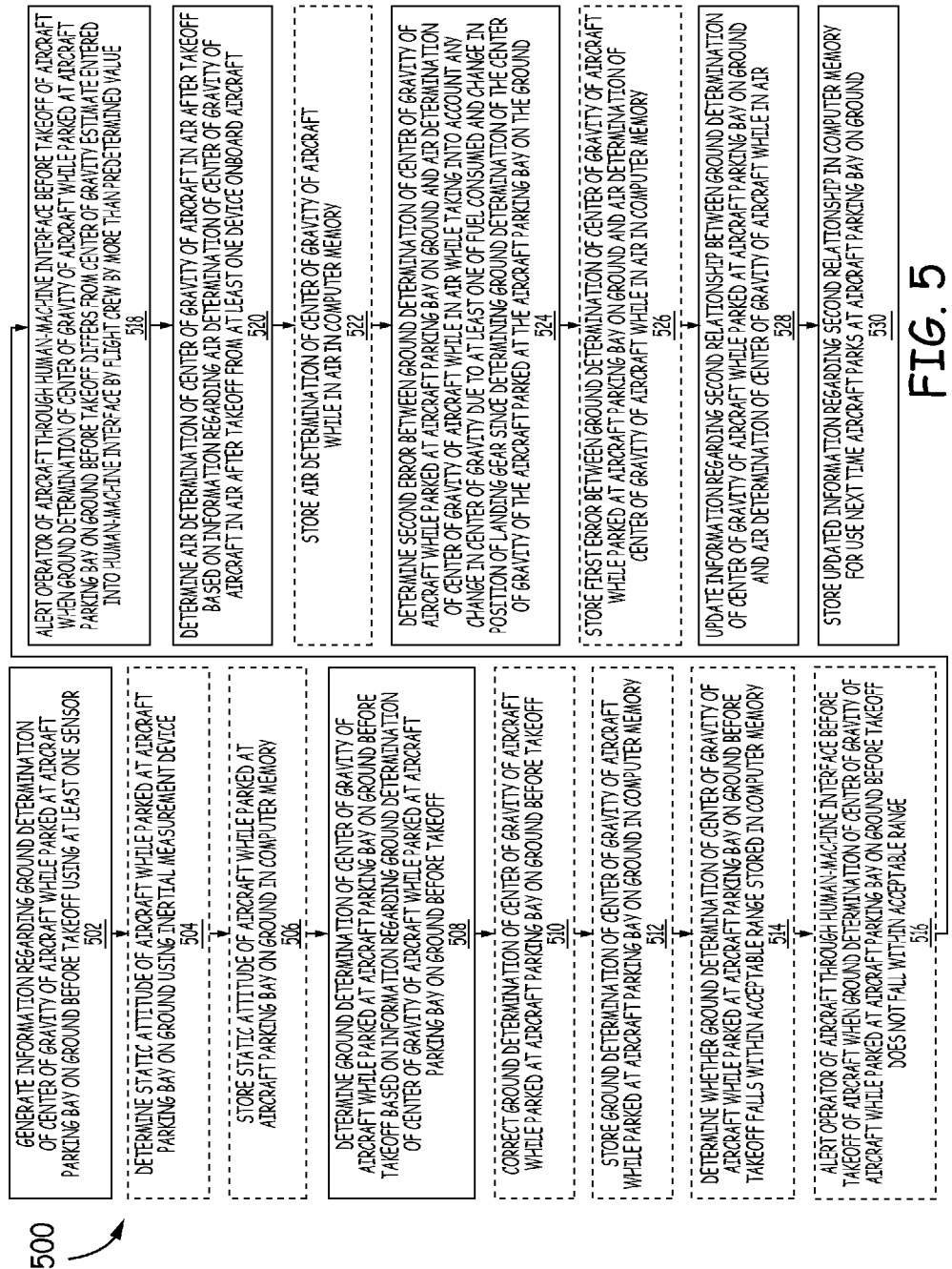

FIG. 4 is a flow diagram depicting an exemplary embodiment of a method for validating a ground determination of gross weight against an air determination of gross weight according to the present disclosure; and FIG. 5 is a flow diagram depicting an exemplary embodiment of a method for validating a ground determination of center of gravity against an air determination of center of gravity according to the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the drawing figures and the specification are not to be construed as limiting the order in which the individual steps may be performed. The following detailed description is, therefore, not to be taken in a limiting sense.

The embodiments described below utilize air determined gross weight and/or center of gravity once airborne to verify ground determined data air determination of using sensor measurements made on the ground before takeoff and to ensure the ground determined data correctness on the ground by comparing the air determined gross weight and/or center of gravity once airborne with the ground determined gross weight and/or center of gravity. The system can analytically increase the accuracy of the current methods over time. The ground determined gross weight and center of gravity received before takeoff are not as accurate as the air determined gross weight and/or center of gravity determined in the air. The ground determined gross weight and/or center of gravity are dependent on many variables such as slope, aircraft attitude, ambient conditions, etc. and can be compared to the more accurate air determined gross weight and/or center of gravity derived in the air.

The ground determined gross weight is determined using at least one sensor on the ground to generate and provide information regarding the ground determined gross weight of the aircraft while parked at an aircraft parking bay on the ground before takeoff. In exemplary embodiments, at least one sensor is used on each landing gear strut to determine the weight on each strut and the weight on all the struts of the aircraft can be added together to determine the gross weight. Similarly, the ground determined center of gravity is determined using at least one sensor on the ground to generate and provide information regarding the ground determined center of gravity of the aircraft while parked at an aircraft parking bay on the ground before takeoff. In exemplary embodiments, at least one sensor is used on each landing gear strut to determine the weight on each strut and the weight distribution across all the struts of the aircraft can be used to determine the center of gravity.

The air determined gross weight is determined from three vectors once airborne, namely the indicated air speed (IAS), the angle of attack (AOA), and the thrust used, by the flight augmentation computers (FAC). The gross weight and center of gravity calibrated by the flight management system (FMS) can be calibrated every flight to arrive at accurate values through a software engine that allows self-calibration. The air determined center of gravity is determined based on the position of a Trimable Horizontal Stabilizer shown as a percentage of the Mean Aerodynamic Chord (MAC) when airborne.

Figure 1A:
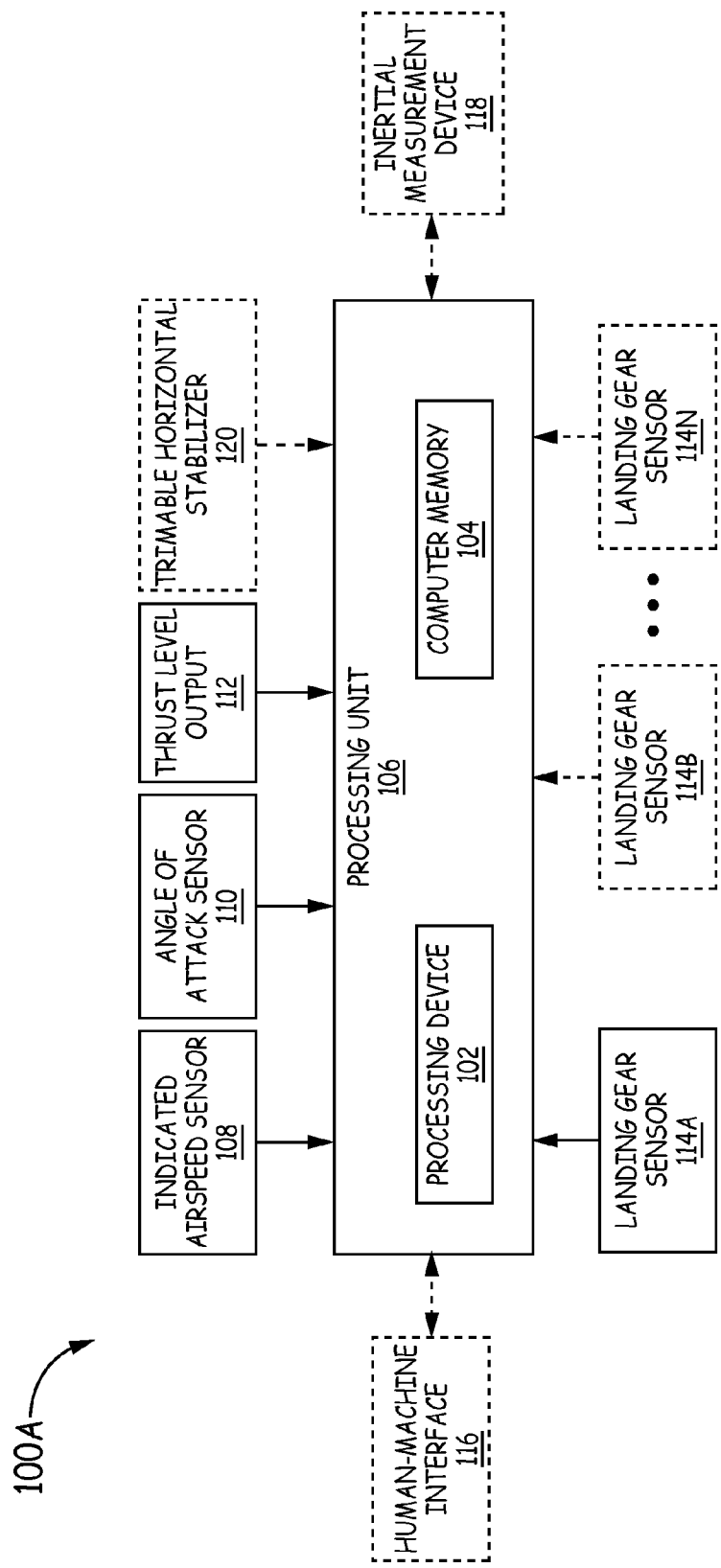
FIGS. 1A-1B are block diagrams depicting exemplary embodiments of systems according to the present disclosure.
Figure 1B:
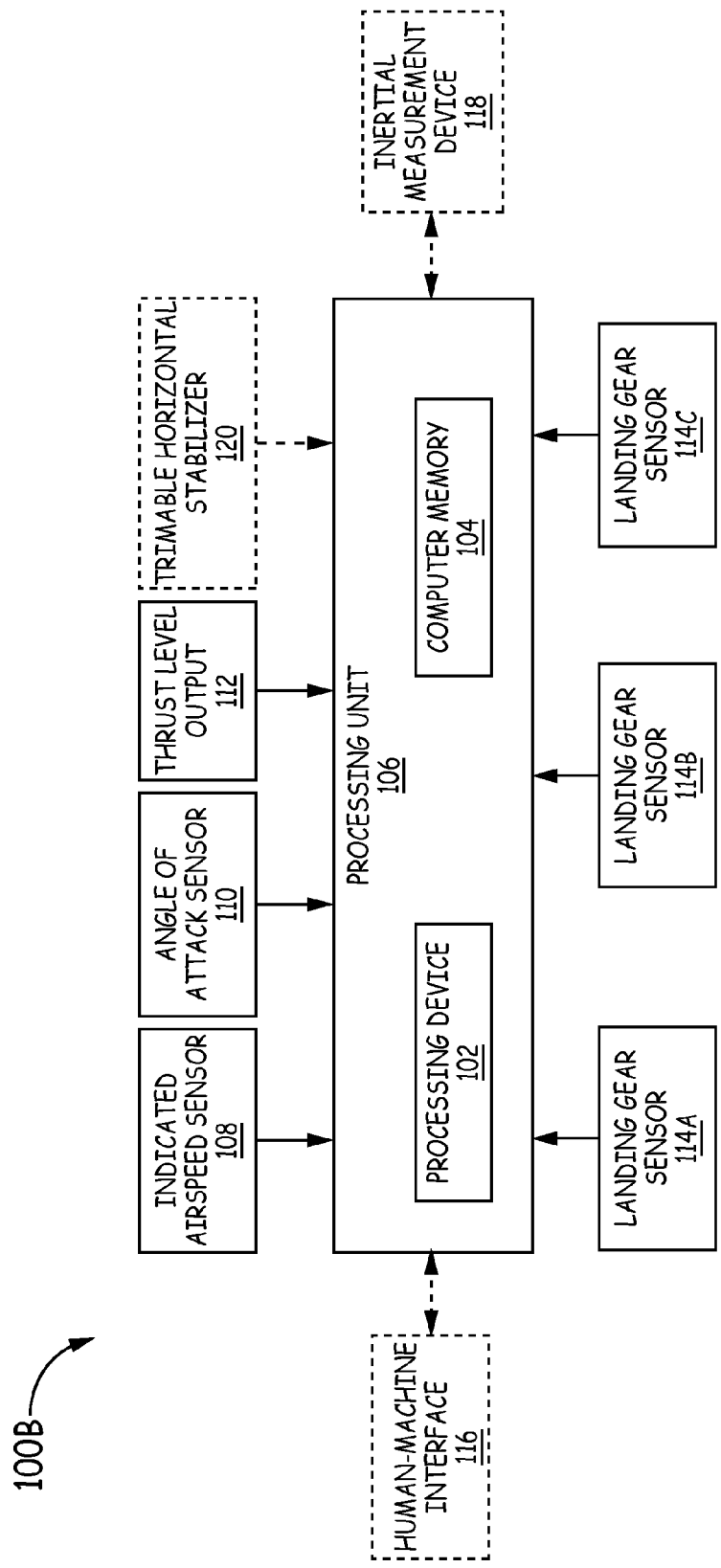

FIGS. 1A-1B are block diagrams depicting exemplary embodiments of systems 100. Any of systems 100 may be implemented on aircraft including jets, planes, helicopters, blimps, balloons, and space vehicles. Each of FIGS. 1A-1B illustrates a different embodiment of system 100, labeled 100A-100B respectively.

FIG. 1A is a block diagram depicting an exemplary embodiment of system 100A for validating a ground determination of a gross weight and/or center of gravity of an aircraft. In exemplary embodiments, system 100A is implemented onboard an aircraft by augmenting avionics systems and/or computers currently in place (such as Flight Management Systems (FMS), Flight Augmentation Computers (FAC), and Fuel Control and Management Computer (FCMC)). In other embodiments, system 100A is implemented onboard aircraft with entirely new avionics computers and/or systems. In exemplary embodiments, the systems and methods described herein are implemented, at least in part, in a new Smart Learning Software Engine (SLeSE) functionality in avionics computers and/or systems. System 100A includes a processor 102 and a computer memory 104 combined in a processing unit 106. System 100A also includes indicated airspeed sensor (IAS) 108, angle of attack (AOA) sensor 110, thrust level output 112, and at least one landing gear sensor 114 (such as landing gear sensor 114A and any quantity of optional landing gear sensor 114B through optional landing gear sensor 114N) each communicatively coupled to the processing unit 106 and more specifically the processor 102 and the computer memory 104. In exemplary embodiments, system 100A also includes optional human-machine interface 116, optional inertial measurement device 118, and/or optional Trimable Horizontal Stabilizer 120.

Indicated airspeed sensor (IAS) 108 is configured to determine and provide the indicated airspeed of the aircraft to the processor 102 within the processing unit 106. While only a single indicated airspeed sensor 108 is shown in system 100A, it is understood that other implementations may include any number of indicated airspeed sensor 108. In exemplary embodiments, the indicated airspeed is determined in knots-indicated air speed (KIAS). In exemplary embodiments, the indicated air speed is the airspeed read directly from the airspeed indicator of an aircraft. In exemplary embodiments, the indicated airspeed varies from the true airspeed of the aircraft depending upon the atmospheric conditions and configuration of the aircraft and even upon how the aircraft is being flown. In exemplary embodiments, the indicated airspeed sensor 108 includes a Pitot/Static sensor mounted on the outside of the aircraft to measure dynamic pressure of the air and a static pressure sensor is also mounted on the outside of the aircraft to measure the static pressure. In exemplary embodiments, the static pressure can be subtracted from the total pressure and corrected to provide the indicated airspeed.

Angle of attack (AOA) sensor 110 is configured to determine and provide the angle of attack of the aircraft to the processor 102 within the processing unit 106. In exemplary embodiments, the angle of attack is determined in degrees or radians. In exemplary embodiments, the angle of attack is the angle between the reference line of the aircraft and the vector representing the relative motion between the aircraft and the air through which it is moving. In exemplary implementations, the angle of attack specifies the angle between the chord line of a the wing of a fixed-wing aircraft and the vector representing the relative motion between the aircraft and the atmosphere. In exemplary embodiments, the critical angle of attack (also called the stall angle of attack) is the angle of attack which produces maximum lift coefficient. In exemplary embodiments, the angle of attack sensor 110 includes tip and/or tilt sensors. In exemplary embodiments, the angle of attack sensor 110 includes one of flow vanes, fixed differential pressure probes, and null seeking servo actuated differential pressure probes. In implementations using flow vanes, the flow vanes rotate freely about the lateral axis of the aircraft, mounted on either side of the aircraft to provide the angle of attack. In implementations using the fixed differential pressure probes, two pressure ports measure the flow angle in each axis and the difference indicates the angle of attack. In implementations using the null seeking servo actuated differential pressure probes, the null seeking servo actuated differential pressure probes are rated by a server to seek a null and the angle of rotation is used to determine the angle of attack.

Thrust level output 112 is configured to provide the thrust applied to the aircraft to the processor 102 within the processing unit 106. In exemplary embodiments, the thrust of the aircraft is provided in pounds (lbs.). In exemplary embodiments using jet engine aircraft, the thrust is set by the pilot either by the revolutions per minute (RPM) of the low pressure compressor (referred to as N1) of the jet engines in percentage or as engine pressure ratio (EPR) which is the ratio of total pressure (Pt) measured at stations 2 and 8 of the jet engines (Pt2/Pt8).

The landing gear sensor 114 A and optional landing gear sensors 114B through 114N generate and provide information regarding the ground determination of the gross weight of the aircraft while parked at the aircraft parking bay on the ground before takeoff to the processing device 102. In exemplary embodiments, each of landing gear sensor 114A and optional landing gear sensor 114B through optional landing gear sensor 114N include at least one of a pressure sensor, a stress sensor, a torque sensor, a strain gauge, a Surface Acoustic Wave (SAW) sensor, and a piezoelectric sensor mounted on at least one of a strut, an oleo, a hinge, a pivot pin, a trunnion pin, and a resting point on a spar of the aircraft landing gear. In exemplary embodiments, the information regarding the ground determination of the gross weight of the aircraft while parked at the aircraft parking bay on the ground before takeoff is at least one of weight, pressure, stress, torque, and strain on at least one landing gear of the aircraft.

In exemplary embodiments, at least one landing gear sensor 114 is included on each landing gear of the aircraft. In exemplary embodiments, the landing gear sensors 114 are self-temperature compensated to ensure that the weight at each landing gear is accurately calculated. In exemplary embodiments, the weight of the gears below the sensors is taken into account when the weight of the aircraft is calculated at each landing gear.

In the exemplary system 100A, the processing device 102 is communicatively coupled to the computer memory 104. While only a single processing device 102 and computer memory 104 are shown in exemplary system 100A, it is understood that other implementations may include any number of processing device 102 and computer memory 104. The processing unit 106 generally and the processing device 102 specifically includes or functions with software programs, firmware or other computer readable instructions for carrying out various methods, process tasks, calculations, and control functions, used in the systems and methods described herein.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CDROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

In exemplary embodiments implementing validation of gross weight of the aircraft, the processing device 102 is configured to receive a ground determination of gross weight of an aircraft while parked at an aircraft parking bay on the ground before takeoff. In exemplary embodiments, the ground determination of gross weight is provided by at least one sensor on the aircraft that can be used to determine the weight on the landing gear struts of the aircraft. Specifically, each landing gear sensor 114 provides information regarding the weight supported by the aircraft landing gears to which it is associated to the processing device 102. The processing device 102 combines these measurements to determine the aircraft gross weight. In exemplary implementations, the processing device 102 simply adds the measurement of weight on each of the landing gears to obtain the ground determination of the gross weight of the aircraft. In exemplary embodiments, the weight of the gears below the at least one landing gear sensor 114 is taken into account in determining the ground determination of gross weight. In other embodiments, a ground determination of gross weight is provided by the flight or maintenance crews and input into the system 100A using optional human-machine interface 116.

The aircraft parking bay can be any of various types of aircraft parking bays as long as it is distinct and identifiable from other aircraft parking bays. In exemplary embodiments, the aircraft parking bay is distinct and identifiable by a parking bay number, by its geographic location (in coordinates), by the airport or landing strip it is at, etc. The processing device 102 is further configured to determine whether the ground determination of the gross weight of the aircraft while parked at the aircraft parking bay on the ground before takeoff falls within an acceptable gross weight range stored in the at least one computer memory 104. In exemplary embodiments, the ground determination of gross weight occurs while the aircraft is parked at the aircraft parking bay, such as before or when the doors are closed and/or the parking brake is released.

The processing device 102 is further configured to determine the gross weight of the aircraft in the air after takeoff based on an indicated airspeed of the aircraft, an angle of attack of the aircraft, and thrust applied to the aircraft. In exemplary embodiments, the indicated airspeed of the aircraft is provided by the indicated airspeed sensor 108. In exemplary embodiments, the angle of attack of the aircraft is provided by the angle of attack sensor 110. In exemplary embodiments, the thrust applied to the aircraft is provided by the thrust level output 112. In exemplary embodiments, the gross weight of the aircraft is determined (for example, mathematically or geometrically) based on the indicated airspeed of the aircraft, the angle of attack of the aircraft, and the thrust applied to the aircraft. For a given weight, the relationship between the three vectors of indicated airspeed, angle of attack, and thrust will be constant. In exemplary embodiments, an aircraft has at least one Flight Augmentation Computer (FAC) that computes the gross weight of the aircraft as soon as it is airborne using the indicated airspeed, angle of attack, and thrust.

The processing device 102 is further configured to determine a first error between the ground determination of the gross weight of the aircraft while parked at the aircraft parking bay on the ground and the air determination of gross weight of the aircraft while in the air while taking into account any reduction in gross weight of the aircraft due to fuel consumed since receiving the ground determination of the gross weight of the aircraft parked at the aircraft parking bay on the ground. In implementations, a fuel measurement system is used to accurately measure the amount of fuel consumed so that its weight can be taken into consideration. The processing device 102 is further configured to update information regarding a relationship between the ground determination of the gross weight of the aircraft while parked at the aircraft parking bay on the ground and the air determination of gross weight of the aircraft while in the air.

The computer memory 104 is configured to store the acceptable gross weight range and the updated information regarding the relationship which can be used the next time the aircraft parks at the aircraft parking bay on the ground. In exemplary embodiments the next time the aircraft parks at the same aircraft parking bay on the ground, the system can determine an updated gross weight range based on the first error between the ground determination of the gross weight of the aircraft while parked at the aircraft parking bay on the ground and the air determination of gross weight of the aircraft while in the air. The flight crew can be alerted if the new ground determination of gross weight provided to the system is outside of the updated gross weight range using optional human-machine interface 116. In exemplary embodiments the next time the aircraft parks at the aircraft parking bay on the ground, the new ground determination of gross weight can automatically be corrected based on the first error between the previous ground determination of the gross weight of the aircraft while parked at the aircraft parking bay on the ground and the air determination of gross weight of the aircraft while in the air while taking into account any reduction in gross weight of the aircraft while in the air while taking into account any reduction in gross weight of the aircraft due to fuel consumed since receiving the ground determination of gross weight. In exemplary implementations, this is as simple as applying the first error directly to the new ground determination of gross weight. As the aircraft continues to use the same aircraft parking bay, the system will continue to fine tune the gross weight range and the first error that should be applied to the gross weight ground determination. As the aircraft uses other parking bays, it will also keep track of this information for each individual parking bay so that it can fine tune the gross weight range and correction that should be applied to the ground determination of gross weight.

In exemplary embodiments implementing validation of center of gravity of the aircraft, the processing device 102 is configured to receive a ground determination of center of gravity of an aircraft while parked at an aircraft parking bay on the ground before takeoff. In exemplary embodiments, the ground determination of center of gravity is determined based on data from at least one sensor on the aircraft that can be used to determine the weight on the individual landing gear struts of the aircraft while the aircraft is parked at the aircraft parking bay on the ground before takeoff. In exemplary embodiments, each landing gear sensor 114 provides information regarding the weight supported by the aircraft landing gears to which each landing gear sensor 114 senses to the processing device 102. In exemplary embodiments, the measured weights by the landing gear sensors 114 on each landing gear will vary with the attitude of the aircraft. For example, if the attitude of the aircraft is nose down, the weight measured by the landing gear sensor 114 in the nose landing gear will be higher and if the attitude is right or left wing down, the weight measured by the lower wing side main landing gear sensor 114 will be higher. While the attitude may have little or no effect on the ground determination of gross weight of the entire aircraft, it generally does effect the derivation of a center of gravity ground determination. Thus, in exemplary embodiments optional inertial measurement device 118 measures the attitude of the static attitude of the aircraft while the aircraft is parked at the aircraft parking bay on the ground before takeoff. In exemplary embodiments, the inertial measurement device 118 is an Inertial Measurement Unit and/or an Inertial Reference System (IRS).

The attitude is then used by the processing device 102 in combination with the information regarding the weight supported by each of the aircraft landing gears from the landing gear sensors 114 to determine the ground determination of aircraft center of gravity. In exemplary embodiments, the center of gravity is expressed as a percentage of Mean Aerodynamic Chord (MAC). In exemplary embodiments, the center of gravity A is determined based on the following equation:

$$A = \frac{W_N * X - (W_L + W_R) * Y}{W_N - W_L - W_R},$$

where A is the center of gravity expressed as a percentage of Mean Aerodynamic Chord (MAC), $W_N$ is the weight acting at the nose gear, $W_L$ and $W_R$ is the weight acting at each of the two main gears, X is the distance between the front of the aircraft and the nose gear, and Y is the distance between the front of the aircraft and the main gear. In other embodiments, a ground determination of center of gravity is provided by the flight or maintenance crews and input into the system 100A using optional human-machine interface 116.

In exemplary embodiments, the ground determination of center of gravity is also based on information regarding the static attitude of the aircraft while the aircraft is parked at the aircraft parking bay on the ground before takeoff. The processing device 102 is further configured to determine whether the ground determination of the center of gravity of the aircraft while parked at the aircraft parking bay on the ground before takeoff falls within an acceptable center of gravity range stored in the at least one computer memory 104. In exemplary embodiments, the acceptable center of gravity range is set by the manufacturer, airline, or other party. In exemplary embodiments, the ground determination of center of gravity occurs while the aircraft is parked at the aircraft parking bay, such as before or when the doors are closed and/or the parking brake is released.

In exemplary embodiments, horizontal reference datum is an imaginary vertical plane or point, arbitrarily fixed somewhere along the longitudinal axis of the aircraft. In exemplary embodiments, the location of the horizontal reference datum corresponds to or is aligned to the Mean Aerodynamic Chord (MAC) of the wings of the aircraft. In exemplary embodiments, a Trimable Horizontal Stabilizer (THS) 120 position is calibrated so that its position on the tail of the aircraft is referenced to this horizontal reference datum, such that the center of gravity (CG) of the aircraft in the farthest forward position is 0% and in the farthest aft position is 100%. In exemplary embodiments, the horizontal reference datum is shown as units designated by a manufacturer from the nose. In other exemplary embodiments, the horizontal reference datum is shown as other types of datum. When in flight, the Trimable Horizontal Stabilizer 120 trims out the pitch of the aircraft so that the elevator mounted on its trailing edge has full authority to control the aircraft in pitch, both nose up and nose down. This "trimmed out" or "in trim" position of the Trimable Horizontal Stabilizer 120 in flight is indicated in % (units) in the cockpit in steady flight when airborne, corresponding to the center of gravity of the aircraft. The Trimable Horizontal Stabilizer 120 position corresponding to the center of gravity is set on ground in % (units) in the cockpit by the trim wheels or the electric trim switches as per the Load and Trim (Balance) Sheet, before takeoff to ensure full authority of the elevator to control the up and down pitch of the aircraft when airborne with takeoff flaps/slats and landing gear down.

The processing device 102 is further configured to determine the center of gravity of the aircraft in the air after takeoff based on information regarding the air determination of the center of gravity of the aircraft in the air after takeoff from at least one device onboard the aircraft. In exemplary embodiments, the at least one device is optional Trimable Horizontal Stabilizer 120. In exemplary embodiments, the processing device implements a Fuel Control and Management Computer (FCMC) that calculates the center of gravity in the air mainly based on the trim position of the Trimable Horizontal Stabilizer in steady flight. In exemplary embodiments, the trim position is shown as a percentage of the Mean Aerodynamic Chord (MAC) or in units.

Since flaps/slats are used for takeoff, the takeoff center of gravity of the aircraft will vary from that of the cruise center of gravity due to the shift of weight when flaps/slats are deployed and the change in center of pressure (the point from which the lift is produced or acts on the aircraft). For takeoff, the slats move forward and downward and the flaps move rearward and downward thereby increasing the area and camber of the wings consequently increasing the lift of the wings at low speeds. After takeoff, the slats move rearward and upward and the flaps move forward and upward. The takeoff center of gravity will vary from that of the cruise center of gravity due to the different positions of the slats and flaps during takeoff. In addition, the takeoff center of gravity will also vary from that of the cruise center of gravity due to the retraction of the landing gear after takeoff, due to the shift of the weight of the landing gear. In exemplary embodiments, the weight shift due to landing gear retraction is not considered in the calculation of the takeoff center of gravity before the landing gear has retracted though it is calculated in the calculation of the cruise center of gravity after the landing gear has retracted.

In exemplary embodiments, the Fuel Control and Management Computer (FCMC) maintains the center of gravity of the aircraft in the air within limits and optimum position for each phase of a flight by transferring fuel from the horizontal stabilizer tanks to and from the wing tanks. In exemplary embodiments, the center of gravity changes as fuel is consumed from certain fuel reservoirs onboard the aircraft. In exemplary embodiments, the center of gravity is adjusted by pumping fuel from a fuel reservoir in one portion of the aircraft to another portion of the aircraft, such from the tail portion of the aircraft to the wing portion of the aircraft and vice versa.

In exemplary embodiments, the Fuel Control and Management Computer (FCMC) constantly monitors the center of gravity and the Trimable Horizontal Stabilizer 120 will automatically trim the aircraft based on changes in the center of gravity. In exemplary embodiments, the Trimable Horizontal Stabilizer 120 constantly outputs the trim position of the aircraft as a percentage of the of the Mean Aerodynamic Chord (MAC) or in units. In exemplary embodiments, the Trimable Horizontal Stabilizer 120 is an aerodynamic static control that uses the air loads. In exemplary embodiments, an aircraft has at least one Fuel Control and Management Computer (FCMC) that computes the center of gravity of the aircraft as soon as it is airborne using the trim position of the aircraft as a percentage of the MAC provided by the Trimable Horizontal Stabilizer.

The processing device 102 is further configured to determine a second error between the ground determination of the center of gravity of the aircraft while parked at the aircraft parking bay on the ground and the air determination of center of gravity of the aircraft while in the air while taking into account any change in the center of gravity due to at least one of fuel consumed and change in position of the landing gear since determining the ground determination of the center of gravity of the aircraft parked at the aircraft parking bay on the ground. In implementations, a fuel measurement system is used to accurately measure the amount of fuel consumed so that its weight can be taken into consideration. The processing device 102 is further configured to update information regarding a relationship between the ground determination of the center of gravity of the aircraft while parked at the aircraft parking bay on the ground and the air determination of center of gravity of the aircraft while in the air.

The computer memory 104 is configured to store the acceptable center of gravity range and the updated information regarding the relationship which can be used the next time the aircraft parks at the aircraft parking bay on the ground. In exemplary embodiments the next time the aircraft parks at the same aircraft parking bay on the ground, the system can determined an updated center of gravity range based on the first error between the ground determination of the center of gravity of the aircraft while parked at the aircraft parking bay on the ground and the air determination of center of gravity of the aircraft while in the air. The flight crew can be alerted if the new ground determination of center of gravity provided to the system is outside of the updated center of gravity range using optional human-machine interface 116. In exemplary embodiments the next time the aircraft parks at the aircraft parking bay on the ground, the new ground determination of center of gravity can automatically be corrected based on the second error between the previous ground determination of the center of gravity of the aircraft while parked at the aircraft parking bay on the ground and the air determination of center of gravity of the aircraft while in the air while taking into account any reduction in gross weight of the aircraft while in the air while taking into account any change in center of gravity of the aircraft due to fuel consumed since receiving the ground determination of center of gravity. In exemplary implementations, this is as simple as applying the second error directly to the new ground determination of center of gravity. As the aircraft continues to use the same aircraft parking bay, the system will continue to fine tune the center of gravity range and the second error that should be applied to the center of gravity ground determination. As the aircraft uses other parking bays, it will also keep track of this information for each individual parking bay so that it can fine tune the center of gravity range and correction that should be applied to the ground determination of center of gravity.

FIG. 1B is a block diagram depicting an exemplary embodiment of a system 100B. System 100B includes processor 102, computer memory 104, processing unit 106, indicated airspeed sensor (IAS) 108, angle of attack (AOA) sensor 110, thrust level output 112, landing gear sensor 114A, landing gear sensor 114B, and landing gear sensor 114N, optional human-machine interface 116, and optional Trimable Horizontal Stabilizer 120. System 100B includes similar components to system 100A described above. The difference between system 100B and system 100A is that system 100B specifically includes three landing gear sensors, landing gear sensor 114A, landing gear sensor 114B, and landing gear sensor 114C.

In exemplary embodiments, the processing device 102 is further configured to determine the gravitational (G) loads on each landing gear during touch-down by comparing the maximum reading of each landing gear sensor 114 to that of its reading after parking, after allowing for the fuel consumed from touchdown to parking engine switch off or first door opening time. This can complement the G values recorded in a digital flight data recorder (DFDR) or a flight data recorder (FDR) and could be used to verify the safety of the undercarriage and main wing spars and robustness of the nose gear.

Figure 2:
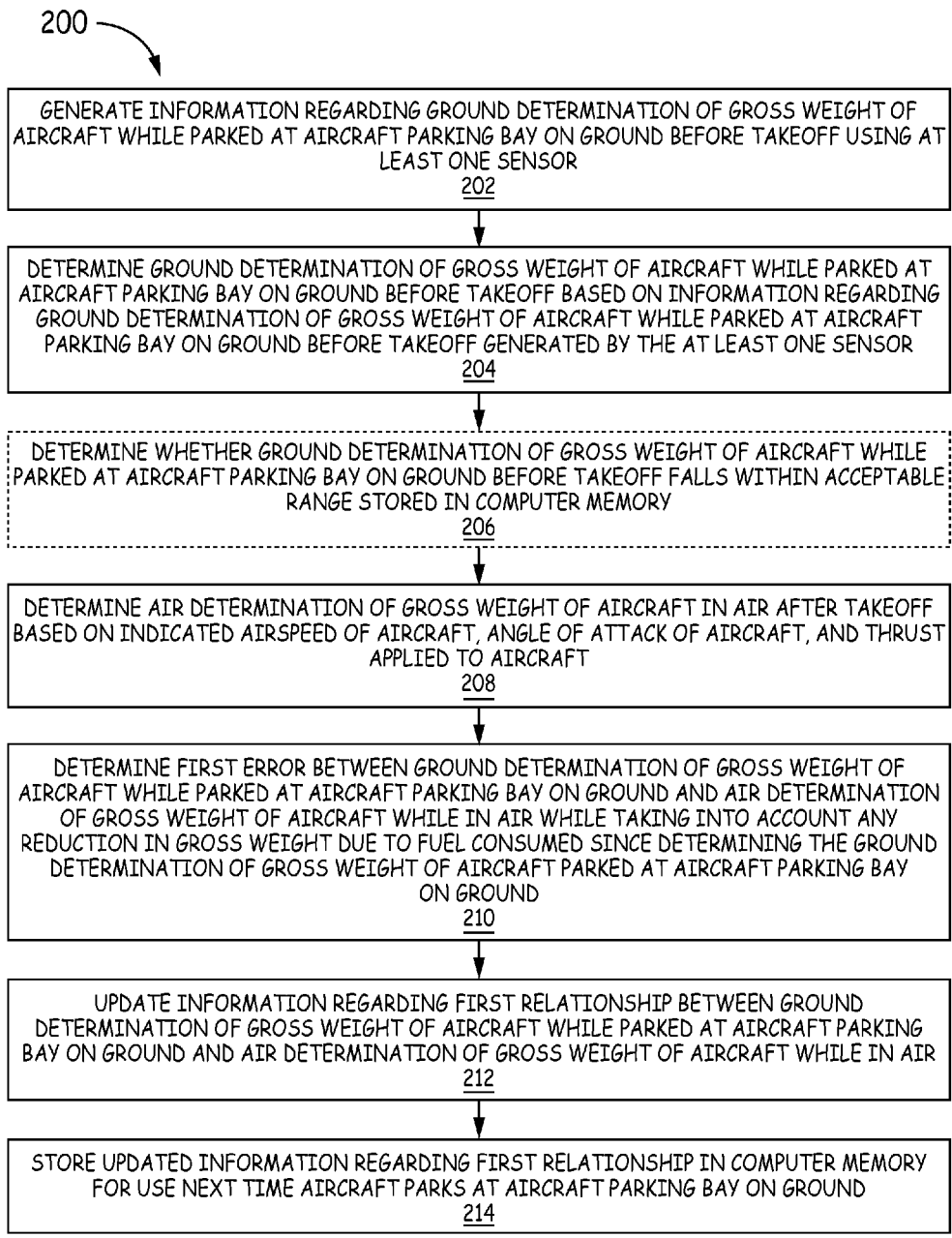
FIG. 2 is a flow diagram depicting an exemplary embodiment of a method for validating a ground determination of gross weight of an aircraft against an air determined gross weight of the aircraft according to the present disclosure.

FIG. 2 is a flow diagram depicting an exemplary method 200 for validating a ground determination of gross weight of an aircraft against an air determination of gross weight of the aircraft according to the present disclosure. Exemplary method 200 begins at block 202 with generating information regarding a ground determination of a gross weight of an aircraft while parked at an aircraft parking bay on the ground before takeoff using at least one sensor. Exemplary method 200 proceeds to block 204 with determining a ground determination of gross weight of the aircraft while parked at the aircraft parking bay on the ground before takeoff based on information regarding ground determination of gross weight of the aircraft while parked at the aircraft parking bay on the ground before takeoff generated by the at least one sensor.

Exemplary method 200 proceeds to optional block 206 with determining whether the ground determination of the gross weight of the aircraft while parked at an aircraft parking bay on the ground before takeoff falls within an acceptable range stored in a computer memory. Exemplary embodiments of method 200 further include correcting the ground determination of the gross weight of the aircraft while parked at the aircraft parking bay on the ground before takeoff based on information regarding the relationship stored in the computer memory. Exemplary embodiments of method 200 further include alerting an operator of the aircraft before takeoff of the aircraft when the ground determination of the gross weight of the aircraft while parked at the aircraft parking bay on the ground before takeoff does not fall within the acceptable gross weight range. Exemplary embodiments of method 200 further include wherein receiving the ground determination of gross weight of the aircraft at the aircraft parking bay on the ground comprises receiving the ground determination of gross weight of the aircraft input through a human-machine interface. Exemplary embodiments of method 200 further include wherein receiving the ground determination of gross weight of the aircraft at the aircraft parking bay on the ground comprises acquiring the ground determination of gross weight from at least one sensor onboard the aircraft.

Exemplary method 200 proceeds to block 208 with determining an air determination of the gross weight of the aircraft in the air after takeoff based on an indicated airspeed of the aircraft, an angle of attack of the aircraft, and thrust applied to the aircraft. Exemplary embodiments of method 200 further include receiving the indicated airspeed of the aircraft from an indicated airspeed sensor; receiving the angle of attack of the aircraft from an angle of attack sensor; and receiving the thrust applied to the aircraft from a thrust level output. Exemplary method 200 proceeds to block 210 with determining a first error between the ground determination of the gross weight of the aircraft while parked on the ground and the air determination of gross weight of the aircraft while in the air while taking into account any reduction in gross weight of the aircraft due to fuel consumed since receiving the ground determination of the gross weight of the aircraft parked at the aircraft parking bay on the ground.

Exemplary method 200 proceeds to block 212 with updating information regarding a relationship between the ground determination of the gross weight of the aircraft while parked at the aircraft parking bay on the ground and the air determination of the gross weight of the aircraft while in the air. Exemplary method 200 proceeds to block 214 with storing the updated information regarding the relationship in the computer memory which is used the next time the aircraft parks at the aircraft parking bay on the ground. Exemplary embodiments of method 200 further include storing the ground determination of the gross weight of the aircraft while parked at the aircraft parking bay on the ground in a computer memory; storing the air determination of gross weight of the aircraft while in the air in the computer memory; and storing the determined error between the ground determination of the gross weight of the aircraft while parked at the aircraft parking bay on the ground and the air determination of gross weight of the aircraft while in the air in the computer memory.

Figure 3:
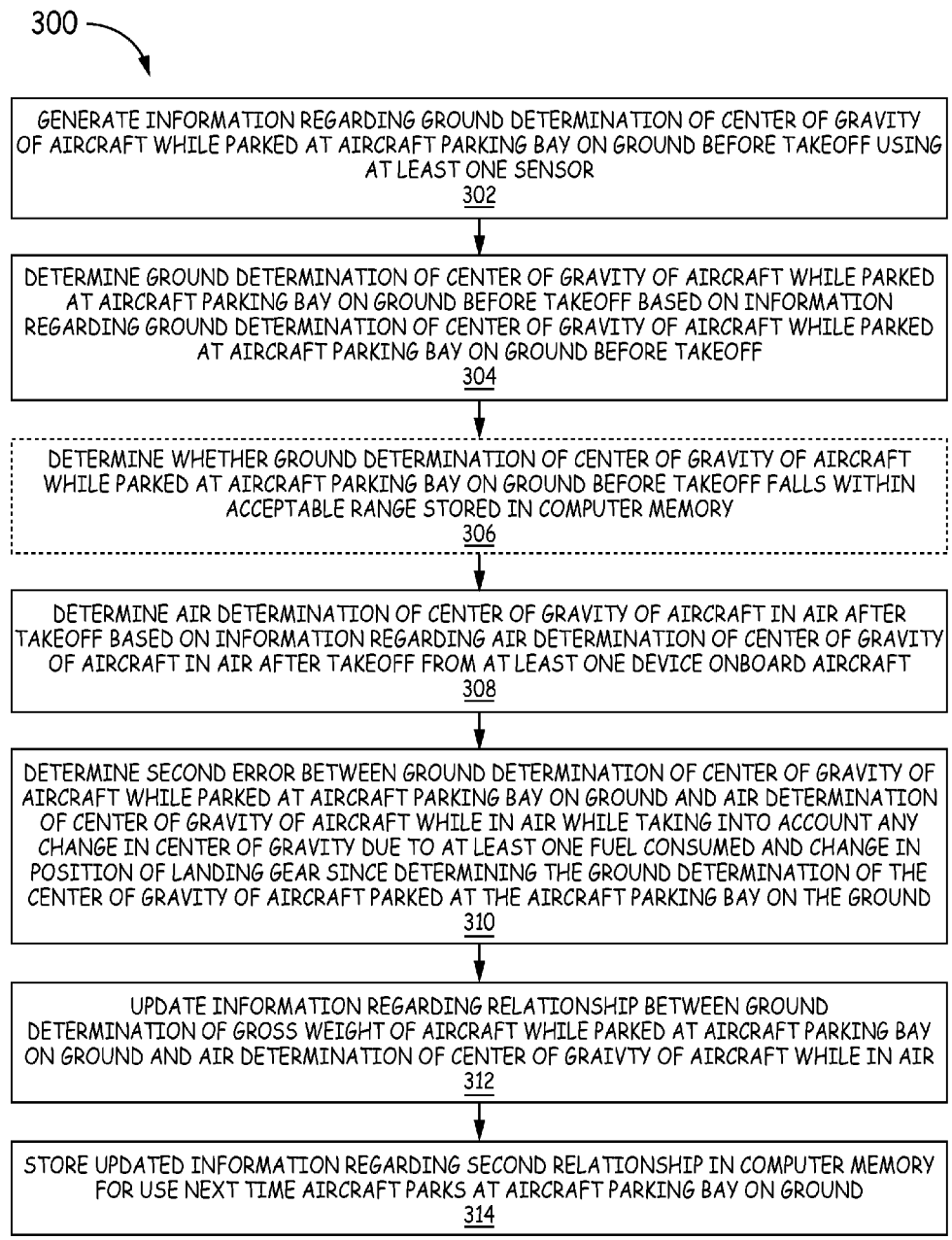
FIG. 3 is a flow diagram depicting an exemplary embodiment of a method for validating a ground determination of center of gravity of an aircraft against an air determination of center of gravity of the aircraft according to the present disclosure.

FIG. 3 is a flow diagram depicting an exemplary method 300 for validating a ground determination of center of gravity of an aircraft against an air determination of center of gravity of the aircraft according to the present disclosure. Exemplary method 300 begins at block 302 with generating information regarding a ground determination of a center of gravity of an aircraft while parked at an aircraft parking bay on the ground before takeoff using at least one sensor. Exemplary method 300 proceeds to block 304 with determining the ground determination of center of gravity of aircraft while parked at the aircraft parking bay on the ground before takeoff based on information regarding the ground determination of the center of gravity of the aircraft while parked at the aircraft parking bay on the ground before takeoff. In exemplary embodiments, exemplary method 300 proceeds to optional block 306 with determining whether the ground determination of the center of gravity of the aircraft while parked at an aircraft parking bay on the ground before takeoff falls within an acceptable range stored in a computer memory.

Exemplary embodiments of method 300 further include correcting the ground determination of the center of gravity of the aircraft while parked at the aircraft parking bay on the ground before takeoff based on information regarding the relationship stored in the computer memory. Exemplary embodiments of method 300 further include alerting an operator of the aircraft before takeoff of the aircraft when the ground determination of the center of gravity of the aircraft while parked at the aircraft parking bay on the ground before takeoff does not fall within the acceptable center of gravity range. Exemplary embodiments of method 300 further include wherein receiving the ground determination of center of gravity of the aircraft at the aircraft parking bay on the ground comprises receiving the ground determination of center of gravity of the aircraft input through a human-machine interface. Exemplary embodiments of method 300 further include wherein receiving the ground determination of center of gravity of the aircraft at the aircraft parking bay on the ground comprises acquiring the ground determination of center of gravity from at least one sensor onboard the aircraft. Exemplary embodiments of method 300 that include acquiring the ground determination of center of gravity from at least one sensor include determining a static attitude of the aircraft while parked at the aircraft parking bay on the ground before takeoff using an inertial measurement device and using the determination of static attitude in the calculation of center of gravity.

Exemplary method 300 proceeds to block 308 with determining an air determination of center of gravity of the aircraft in the air after takeoff based on information regarding air determination of center of gravity of aircraft in air after takeoff from at least one device onboard the aircraft. Exemplary embodiments of method 300 further include receiving the position of center of gravity as indicated by the calibrated position of the Trimable Horizontal Stabilizer 120 referenced to the horizontal reference datum corresponding to or aligned to the Mean Aerodynamic Chord (MAC) of the wings of the aircraft. Exemplary method 300 proceeds to block 310 with determining a second error between the ground determination of the center of gravity of the aircraft while parked on the ground and the air determination of center of gravity of the aircraft while in the air while taking into account any reduction in gross weight of the aircraft due to fuel consumed since receiving the ground determination of the center of gravity of the aircraft parked at the aircraft parking bay on the ground.

Exemplary method 300 proceeds to block 312 with updating information regarding a relationship between the ground determination of the center of gravity of the aircraft while parked at the aircraft parking bay on the ground and the air determination of center of gravity of the aircraft while in the air. Exemplary method 300 proceeds to block 312 with storing the updated information regarding the relationship in the computer memory which is used the next time the aircraft parks at the aircraft parking bay on the ground. Exemplary embodiments of method 300 further include storing the ground determination of the center of gravity of the aircraft while parked at the aircraft parking bay on the ground in a computer memory; storing the air determination of center of gravity of the aircraft while in the air in the computer memory; and storing the determined error between the ground determination of the center of gravity of the aircraft while parked at the aircraft parking bay on the ground and the air determination of center of gravity of the aircraft while in the air in the computer memory. Exemplary embodiments of method 300 further include storing information identifying the aircraft parking bay while parked at the aircraft parking bay on the ground before takeoff in the computer memory.

In exemplary embodiments, method 200 and method 300 are combined in various ways to create a method for validating ground determinations of both gross weight and center of gravity of an aircraft against an air determination of gross weight and center of gravity of the aircraft according to the present disclosure.

FIG. 4 is a flow diagram depicting an exemplary method 400 for validating a ground determination of gross weight of an aircraft against an air determination of gross weight of the aircraft according to the present disclosure. Methods 400 may be implemented on any aircraft including jets, planes, helicopters, blimps, balloons, and space vehicles. Exemplary method 400 begins at block 402 with generating information regarding a ground determination of a gross weight of an aircraft while parked at an aircraft parking bay on the ground before takeoff using at least one sensor. Exemplary method 400 proceeds to block 404 with determining the ground determination of gross weight of the aircraft while parked at the aircraft parking bay on the ground before takeoff based on information regarding the ground determination of gross weight of the aircraft while parked at the aircraft parking bay on the ground before takeoff generated by the at least one sensor.

Exemplary method 400 proceeds to optional block 406 with correcting the ground determination of gross weight of the aircraft while parked at the aircraft parking bay on the ground before takeoff. Exemplary method 400 proceeds to optional block 408 with storing the ground determination of gross weight of the aircraft while parked at the aircraft parking bay on the ground in a computer memory. Exemplary method 400 proceeds to optional block 410 with determining whether the ground determination of gross weight of the aircraft while parked at the aircraft parking bay on the ground before takeoff falls within an acceptable range stored in the computer memory. Exemplary method 400 proceeds to optional block 412 with alerting an operator of the aircraft through a human-machine interface before takeoff of the aircraft when the ground determination of gross weight of aircraft while parked at the aircraft parking bay on the ground before takeoff does not fall within the acceptable range. Exemplary method 400 proceeds to optional block 414 with alerting an operator of the aircraft through a human-machine interface before takeoff of the aircraft when the ground determination of gross weight of the aircraft while parked at the aircraft parking bay on the ground before takeoff differs from the gross weight estimate entered into the human-machine interface by the flight crew by more than a predetermined value. In exemplary embodiments, this predetermined value may be defined by any or all of an operator, a manufacturer, and a regulating authority or agency.

Exemplary method 400 proceeds to block 416 with determining an air determination of gross weight of the aircraft in the air after takeoff based on the indicated airspeed of the aircraft, the angle of attack of the aircraft, and the thrust applied to the aircraft. Exemplary method 400 proceeds to optional block 418 with storing the air determination of gross weight of the aircraft while in the air in the computer memory.

Exemplary method 400 proceeds to block 420 with determining the first error between the ground determination of gross weight of the aircraft while parked at the aircraft parking bay on the ground and the air determination of gross weight of the aircraft while in the air while taking into account any reduction in gross weight due to fuel consumed since determining the ground determination of gross weight of the aircraft parked at the aircraft parking bay on the ground. Exemplary method 400 proceeds to optional block 422 with storing the first error between the ground determination of the gross weight of the aircraft while parked at the aircraft parking bay on the ground and the air determination of the gross weight of the aircraft while in the air in the computer memory.

Exemplary method 400 proceeds to block 424 with updating information regarding the first relationship between the ground determination of gross weight of the aircraft while parked at the aircraft parking bay on the ground and the air determination of the gross weight of the aircraft while in the air. Exemplary method 400 proceeds to block 426 with storing the updated information regarding the first relationship in the computer memory for use the next time the aircraft parks at the aircraft parking bay on the ground.

FIG. 5 is a flow diagram depicting an exemplary method 500 for validating a ground determination of center of gravity of an aircraft against an air determination of center of gravity of the aircraft according to the present disclosure. Methods 500 may be implemented on any aircraft including jets, planes, helicopters, blimps, balloons, and space vehicles. Exemplary method 500 begins at block 502 with generating information regarding a ground determination of a center of gravity of an aircraft while parked at an aircraft parking bay on the ground before takeoff using at least one sensor. Exemplary method 500 proceeds to optional block 504 with determining a static attitude of an aircraft while parked at the aircraft parking bay on the ground using an inertial measurement device. Exemplary method 500 proceeds to optional block 506 with storing the static attitude of the aircraft while parked at the aircraft parking bay on the ground in the computer memory.

Exemplary method 500 proceeds to block 508 with determining a ground determination of center of gravity of the aircraft while parked at the aircraft parking bay on the ground before takeoff based on information regarding the ground determination of center of gravity of the aircraft while parked at the aircraft parking bay on the ground before takeoff. Exemplary method 500 proceeds to optional block 510 with correcting the determination of center of gravity of the aircraft while parked at the aircraft parking bay on the ground before takeoff. Exemplary method 500 proceeds to optional block 512 with storing the ground determination of center of gravity of the aircraft while parked at the aircraft parking bay on the ground in a computer memory.

Exemplary method 500 proceeds to optional block 514 with determining whether the ground determination of center of gravity of the aircraft while parked at the aircraft parking bay on the ground before takeoff falls within an acceptable range stored in the computer memory. Exemplary method 500 proceeds to optional block 516 with alerting the operator of the aircraft through a human-machine interface before takeoff of the aircraft when the ground determination of the center of gravity of the aircraft while parked at the aircraft parking bay on the ground before takeoff does not fall within the acceptable range. Exemplary method 500 proceeds to optional block 518 with alerting the operator of the aircraft through a human-machine interface before takeoff of the aircraft when the ground determination of center of gravity of the aircraft while parked at the aircraft parking bay on the ground before takeoff differs from a center of gravity estimate entered into the human machine interface by the flight crew by more than a predetermined value. In exemplary embodiments, this predetermined value may be defined by any or all of an operator, a manufacturer, and a regulating authority or agency.

Exemplary method 500 proceeds to block 520 with determining an air determination of the center of gravity of the aircraft in the air after takeoff based on information regarding the air determination of center of gravity of the aircraft in the air after takeoff from at least one device onboard the aircraft. Exemplary method 500 proceeds to optional block 522 with storing the air determination of center of gravity of the aircraft while in the air in a computer memory.

Exemplary method 500 proceeds to block 524 with determining a second error between the ground determination of the center of gravity of the aircraft while parked at the aircraft parking bay on the ground and the air determination of the center of gravity of the aircraft while in the air while taking into account any change in the center of gravity due to at least one of fuel consumed and change in position of the landing gear since determining the ground determination of the center of gravity of the aircraft parked at the aircraft parking bay on the ground. Exemplary method 500 proceeds to optional block 526 with storing the first error between the ground determination of the center of gravity of the aircraft while parked at the aircraft parking bay on the ground and the air determination of the center of gravity of the aircraft while in the air in a computer memory.

Exemplary method 500 proceeds to block 528 with updating information regarding a second relationship between the ground determination of center of gravity of the aircraft while parked at the aircraft parking bay on the ground and the air determination of the center of gravity of the aircraft while in the air. Exemplary method 500 proceeds to block 530 with storing the updated information regarding the second relationship in the computer memory for use next time the aircraft parks at the aircraft parking bay on the ground.

In exemplary embodiments, method 400 and method 500 are combined in various ways to create a method for validating ground determinations of both gross weight and center of gravity of an aircraft against an air determination of gross weight and center of gravity of the aircraft according to the present disclosure.

Although specific embodiments have been illustrated and described herein, it will be appreciated by those of ordinary skill in the art that any arrangement, which is determined to achieve the same purpose, may be substituted for the specific embodiments shown. Therefore, it is manifestly intended that this invention be limited only by the claims and the equivalents thereof.

EXAMPLE EMBODIMENTS

Example 1 includes a system for validating a ground determination of a gross weight of an aircraft, the system comprising: at least one sensor configured to generate information regarding a ground determination of gross weight of an aircraft while parked at an aircraft parking bay on the ground before takeoff; at least one processing device communicatively coupled to the at least one sensor and configured to receive the information regarding the ground determination of the gross weight of the aircraft while parked at the aircraft parking bay on the ground before takeoff from the at least one sensor; at least one computer memory communicatively coupled to the at least one processing device; wherein the at least one processing device is configured to determine the ground determination of the gross weight of the aircraft while parked at the aircraft parking bay on the ground before takeoff based on the information regarding the ground determination of gross weight of the aircraft while parked at the aircraft parking bay on the ground before takeoff generated by the at least one sensor; wherein the at least one processing device is further configured to determine the gross weight of the aircraft in the air after takeoff based on an indicated airspeed of the aircraft, an angle of attack of the aircraft, and thrust applied to the aircraft; wherein the at least one processing device is further configured to determine a first error between the ground determination of the gross weight of the aircraft while parked at the aircraft parking bay on the ground and the air determination of gross weight of the aircraft while in the air while taking into account any reduction in gross weight of the aircraft due to fuel consumed since receiving the ground determination of the gross weight of the aircraft parked at the aircraft parking bay on the ground; wherein the at least one processing device is further configured to update information regarding a relationship between the ground determination of the gross weight of the aircraft while parked at the aircraft parking bay on the ground and the air determination of gross weight of the aircraft while in the air; and wherein the at least one computer memory is configured to store the updated information regarding the relationship for use next time the aircraft parks at the aircraft parking bay on the ground.

Example 2 includes the system of Example 1, further comprising: an indicated airspeed sensor communicatively coupled to the at least one processing device, the indicated airspeed sensor configured to determine and provide the indicated airspeed of the aircraft to the at least one processing device; an angle of attack sensor communicatively coupled to the at least one processing device, the angle of attack sensor configured to determine and provide the angle of attack of the aircraft to the at least one processing device; and a thrust level output communicatively coupled to the at least one processing device, the thrust level output configured to provide the thrust applied to the aircraft to the at least one processing device.

Example 3 includes the system of any of Examples 1-2, wherein the at least one processing device is further configured to correct the ground determination of the gross weight of the aircraft while parked at the aircraft parking bay on the ground before takeoff based on information regarding the relationship stored in the computer memory.

Example 4 includes the system of any of Examples 1-3, wherein the at least one processing device is further configured to determine whether the ground determination of the gross weight of the aircraft while parked at the aircraft parking bay on the ground before takeoff falls within an acceptable gross weight range stored in the at least one computer memory, wherein the acceptable gross weight range is determined based on the updated information regarding the relationship between the ground determination of the gross weight of the aircraft while parked at the aircraft parking bay on the ground and the air determination of gross weight of the aircraft while in the air.

Example 5 includes the system of Example 4, further comprising a human-machine interface communicatively coupled to the at least one processing device; and wherein the at least one processing device is further configured to alert an operator of the aircraft through the human-machine interface before takeoff of the aircraft when the ground determination of the gross weight of the aircraft while parked at the aircraft parking bay on the ground before takeoff does not fall within the acceptable gross weight range.

Example 6 includes the system of any of Examples 1-5, further comprising a human-machine interface communicatively coupled to the at least one processing device; and wherein the at least one processing device is further configured to receive the ground determination of gross weight of the aircraft while parked at the aircraft parking bay on the ground input through the human-machine interface.

Example 7 includes the system of Example 6, wherein the at least one sensor includes at least one of a pressure sensor, a stress sensor, a torque sensor, a strain gauge, a Surface Acoustic Wave (SAW) sensor, and a piezoelectric sensor mounted on at least one of a strut, an oleo, a hinge, a pivot pin, a trunnion pin, and a resting point on a spar; and wherein the information regarding the ground determination of the gross weight of the aircraft while parked at the aircraft parking bay on the ground before takeoff is at least one of weight, pressure, stress, torque, and strain on at least one landing gear of the aircraft.

Example 8 includes the system of any of Examples 1-7, further comprising: wherein the at least one processing device is configured to determine a ground determination of a center of gravity of the aircraft while parked at the aircraft parking bay on the ground before takeoff based on at least one device configured to generate information regarding the ground determination of the center of gravity of the aircraft while parked at an aircraft parking bay on the ground before takeoff; wherein the at least one processing device is further configured to determine an air determination of the center of gravity of the aircraft in the air after takeoff based on information regarding the air determination of the center of gravity of the aircraft in the air after takeoff from at least one device onboard the aircraft; wherein the at least one processing device is further configured to determine a second error between the ground determination of the center of gravity of the aircraft while parked at the aircraft parking bay on the ground and the air determination of center of gravity of the aircraft while in the air while taking into account any reduction in gross weight of the aircraft due to fuel consumed since receiving the ground determination of the gross weight of the aircraft parked at the aircraft parking bay on the ground; wherein the at least one processing device is configured to update information regarding a second relationship between the ground determination of the gross weight of the aircraft while parked at the aircraft parking bay on the ground and the air determination of gross weight of the aircraft while in the air; and wherein the at least one computer memory is further configured to store the updated information regarding the relationship for use next time the aircraft parks at the aircraft parking bay on the ground.

Example 9 includes the system of Example 8, wherein the at least one device that provides information regarding the air determination of the center of gravity of the aircraft in the air after takeoff from at least one device onboard the aircraft is a Trimable Horizontal Stabilizer.

Example 10 includes the system of any of Examples 1-9, further comprising at least one sensor configured to generate and provide information regarding the ground determination of the gross weight of the aircraft while parked at the aircraft parking bay on the ground before takeoff to the at least one processing device; and an inertial measurement device configured to determine a static attitude of the aircraft when the ground determination of the gross weight of the aircraft is received while the aircraft is parked at the aircraft parking bay on the ground before takeoff and provide the static attitude to the at least one processing device; and wherein the at least one processing device is configured to receive a ground determination of the center of gravity of the aircraft while parked at the aircraft parking bay on the ground before takeoff by processing the information regarding the ground determination of gross weight and static attitude of the aircraft while parked at the aircraft parking bay on the ground before takeoff.

Example 11 includes a method for validating a ground determination of a gross weight of an aircraft against an air determination of gross weight comprising: generating information regarding a ground determination of gross weight of an aircraft while parked at an aircraft parking bay on the ground before takeoff using at least one sensor; determining the ground determination of gross weight of an aircraft while parked at an aircraft parking bay on the ground before takeoff based on the information regarding the ground determination of gross weight of the aircraft while parked at the aircraft parking bay on the ground before takeoff generated by the at least one sensor; determining an air determination of gross weight of the aircraft in the air after takeoff based on an indicated airspeed of the aircraft, an angle of attack of the aircraft, and thrust applied to the aircraft; determining a first error between the ground determination of the gross weight of the aircraft while parked at the aircraft parking bay on the ground and the air determination of gross weight of the aircraft while in the air while taking into account any reduction in gross weight of the aircraft due to fuel consumed since determining the ground determination of the gross weight of the aircraft parked at the aircraft parking bay on the ground; updating information regarding a relationship between the ground determination of the gross weight of the aircraft while parked at the aircraft parking bay on the ground and the air determination of gross weight of the aircraft while in the air; and storing the updated information regarding the relationship in the computer memory for use next time the aircraft parks at the aircraft parking bay on the ground.

Example 12 includes the method of Example 11, further comprising: receiving the indicated airspeed of the aircraft from an indicated airspeed sensor; receiving the angle of attack of the aircraft from an angle of attack sensor; and receiving the thrust applied to the aircraft from a thrust level output.

Example 13 includes the method of any of Examples 11-12, further comprising: correcting the ground determination of the gross weight of the aircraft while parked at the aircraft parking bay on the ground before takeoff based on information regarding the relationship stored in the computer memory.

Example 14 includes the method of any of Examples 11-13, further comprising: determining whether the ground determination of the gross weight of the aircraft while parked at the aircraft parking bay on the ground before takeoff falls within an acceptable gross weight range stored in a computer memory.

Example 15 includes the method of any of Examples 11-14, further comprising: alerting an operator of the aircraft before takeoff of the aircraft when the ground determination of the gross weight of the aircraft while parked at the aircraft parking bay on the ground before takeoff does not fall within the acceptable gross weight range.

Example 16 includes the method of any of Examples 11-15, further comprising: storing the ground determination of the gross weight of the aircraft while parked at the aircraft parking bay on the ground in a computer memory; storing the air determination of gross weight of the aircraft while in the air in the computer memory; and storing the determined error between the ground determination of the gross weight of the aircraft while parked at the aircraft parking bay on the ground and the air determination of gross weight of the aircraft while in the air in the computer memory.

Example 17 includes the method of any of Examples 11-16, further comprising: generate information regarding a ground determination of a center of gravity of the aircraft while parked at an aircraft parking bay on the ground before takeoff using at least one sensor; determining the ground determination of a center of gravity of the aircraft while parked at the aircraft parking bay on the ground before takeoff based the information regarding the ground determination of center of gravity of the aircraft while parked at the aircraft parking bay on the ground before takeoff; determining an air determination of the center of gravity of the aircraft in the air after takeoff based on information regarding the air determination of the center of gravity of the aircraft in the air after takeoff from at least one device onboard the aircraft; determining a second error between the ground determination of the center of gravity of the aircraft while parked at the aircraft parking bay on the ground and the air determination of center of gravity of the aircraft while in the air while taking into account any change in the center of gravity due to at least one of fuel consumed and change in position of landing gear since determining the ground determination of the center of gravity of the aircraft parked at the aircraft parking bay on the ground; updating information regarding a second relationship between the ground determination of the center of gravity of the aircraft while parked at the aircraft parking bay on the ground and the air determination of center of gravity of the aircraft while in the air; and storing the updated information regarding the second relationship in the computer memory for use next time the aircraft parks at the aircraft parking bay on the ground.

Example 18 includes the method of Example 17, further comprising: determining a static attitude of the aircraft while parked at the aircraft parking bay on the ground before takeoff using an inertial measurement device; providing the static attitude to the at least one processing device; and wherein receiving a ground determination of the center of gravity of the aircraft while parked at the aircraft parking bay includes receiving weight determinations for each landing gear from at least one landing gear sensor and comparing the weight determinations for each landing gear in view of the static attitude of the aircraft while parked at the parking bay on the ground before takeoff to determine the center of gravity of the aircraft.

Example 19 includes a system for validating a ground determination of a gross weight of an aircraft, the system comprising: at least one processing device; at least one computer memory communicatively coupled to the at least one processing device; at least one human-machine interface communicatively coupled to the at least one processing device; an inertial measurement device communicatively coupled to the at least one processing device and configured to determine a static attitude of the aircraft while parked at an aircraft parking bay on the ground before takeoff and provide the static attitude to the at least one processing device; a plurality of sensors configured to generate and provide weight information regarding the weight at each landing gear strut of the aircraft while parked at the aircraft parking bay on the ground before takeoff to the at least one processing device; an indicated airspeed sensor communicatively coupled to the at least one processing device, the indicated airspeed sensor configured to determine and provide the indicated airspeed of the aircraft while airborne to the at least one processing device; an angle of attack sensor communicatively coupled to the at least one processing device, the angle of attack sensor configured to determine and provide the angle of attack of the aircraft while airborne to the at least one processing device; a thrust measurement output communicatively coupled to the at least one processing device, the thrust sensor configured to provide the thrust applied to the aircraft to the at least one processing device; a Trimable Horizontal Stabilizer communicatively coupled to the at least one processing device, the Trimable Horizontal Stabilizer configured to provide information regarding the center of gravity of the aircraft while airborne to the at least one processing device; wherein the at least one processing device is configured to determine a ground determination of the gross weight of an aircraft while parked at the aircraft parking bay on the ground before takeoff based on the weight information regarding the weight at each landing gear strut of the aircraft provided by the at least one sensor; wherein the at least one processing device is further configured to determine a ground determination of the center of gravity of the aircraft while parked at the aircraft parking bay on the ground before takeoff based on the weight information regarding the weight at each landing gear strut of the aircraft provided by the plurality of sensors and the static attitude of the aircraft while parked at an aircraft parking bay on the ground before takeoff provided by the inertial measurement device; wherein the at least one processing device is further configured to determine an air determination of the gross weight of the aircraft in the air after takeoff based on an indicated airspeed of the aircraft determined by the indicated airspeed sensor, an angle of attack of the aircraft, and thrust applied to the aircraft; wherein the at least one processing device is further configured to determine a first error between the ground determination of the gross weight of the aircraft while parked at the aircraft parking bay on the ground and the air determination of gross weight of the aircraft while in the air while taking into account any reduction in gross weight of the aircraft due to fuel consumed since receiving the ground determination of the gross weight of the aircraft parked at the aircraft parking bay on the ground; wherein the at least one processing device is further configured to determine an air determination of the center of gravity of the aircraft in the air after takeoff based on a position of the center of gravity as indicated by a calibrated position of the Trimable Horizontal Stabilizer (THS) referenced to horizontal datum corresponding to a Mean Aerodynamic Chord (MAC) of wings of the aircraft; wherein the at least one processing device is further configured to determine a second error between the ground determination of the center of gravity of the aircraft while parked at the aircraft parking bay on the ground and the air determination of center of gravity of the aircraft while in the air while taking into account any reduction in gross weight of the aircraft due to fuel consumed since receiving the ground determination of the center of gravity of the aircraft parked at the aircraft parking bay on the ground; wherein the at least one processing device is further configured to update information regarding a first relationship between the ground determination of the gross weight of the aircraft while parked at the aircraft parking bay on the ground and the air determination of gross weight of the aircraft while in the air based on the first error; wherein the at least one processing device is further configured to update information regarding a second relationship between the ground determination of the center of gravity of the aircraft while parked at the aircraft parking bay on the ground and the air determination of center of gravity of the aircraft while in the air based on the second error; wherein the at least one computer memory is configured to store the updated information regarding the first relationship, the updated information regarding the second relationship, the ground determination of the gross weight of the aircraft while parked at the aircraft parking bay on the ground, the static attitude of the aircraft when the ground determination of the gross weight of the aircraft is received while the aircraft is parked at the aircraft parking bay on the ground before takeoff, the ground determination of the center of gravity of the aircraft while parked at the aircraft parking bay on the ground, information identifying the aircraft parking bay when the ground determination of the gross weight of the aircraft is received while the aircraft is parked at the aircraft parking bay on the ground before takeoff, the air determination of gross weight of the aircraft while in the air, the air determination of center of gravity of the aircraft while in the air, the determined error between the ground determination of the gross weight of the aircraft while parked at the aircraft parking bay on the ground and the air determination of gross weight of the aircraft while in the air, and the determined error between the ground determination of the center of gravity of the aircraft while parked at the aircraft parking bay on the ground and the air determination of center of gravity of the aircraft while in the air; and wherein the updated information regarding the first relationship and the updated information regarding the second relationship is used next time the aircraft parks at the aircraft parking bay on the ground.

Example 20 includes the system of Example 19, further comprising: wherein the at least one sensor includes at least one of a pressure sensor, a stress sensor, a torque sensor, a strain gauge, a Surface Acoustic Wave (SAW) sensor, and a piezoelectric sensor mounted on at least one of a strut, an oleo, a hinge, a pivot pin, a trunnion pin, and a resting point on a spar; and wherein the information regarding the ground determination of the gross weight of the aircraft while parked at the aircraft parking bay on the ground before takeoff is at least one of weight, pressure, stress, torque, and strain on at least one landing gear of the aircraft.

What is claimed is:

1. A system for validating a ground determination of a gross weight of an aircraft, the system comprising:
    at least one sensor configured to generate information regarding a ground determination of gross weight of an aircraft while parked at an aircraft parking bay on the ground before takeoff;
    at least one processing device communicatively coupled to the at least one sensor and configured to receive the information regarding the ground determination of the gross weight of the aircraft while parked at the aircraft parking bay on the ground before takeoff from the at least one sensor;
    at least one computer memory communicatively coupled to the at least one processing device;
    wherein the at least one processing device is configured to determine the ground determination of the gross weight of the aircraft while parked at the aircraft parking bay on the ground before takeoff based on the information regarding the ground determination of gross weight of the aircraft while parked at the aircraft parking bay on the ground before takeoff generated by the at least one sensor;
    wherein the at least one processing device is further configured to determine the gross weight of the aircraft in the air after takeoff based on an indicated airspeed of the aircraft, an angle of attack of the aircraft, and thrust applied to the aircraft;
    wherein the at least one processing device is further configured to determine a first error between the ground determination of the gross weight of the aircraft while parked at the aircraft parking bay on the ground and the air determination of gross weight of the aircraft while in the air while taking into account any reduction in gross weight of the aircraft due to fuel consumed since receiving the ground determination of the gross weight of the aircraft parked at the aircraft parking bay on the ground;
    wherein the at least one processing device is further configured to update information regarding a relationship between the ground determination of the gross weight of the aircraft while parked at the aircraft parking bay on the ground and the air determination of gross weight of the aircraft while in the air; and
    wherein the at least one computer memory is configured to store the updated information regarding the relationship for use next time the aircraft parks at the aircraft parking bay on the ground.

2. The system of claim 1, further comprising:
    an indicated airspeed sensor communicatively coupled to the at least one processing device, the indicated airspeed sensor configured to determine and provide the indicated airspeed of the aircraft to the at least one processing device;
    an angle of attack sensor communicatively coupled to the at least one processing device, the angle of attack sensor configured to determine and provide the angle of attack of the aircraft to the at least one processing device; and
    a thrust level output communicatively coupled to the at least one processing device, the thrust level output configured to provide the thrust applied to the aircraft to the at least one processing device.

3. The system of claim 1, wherein the at least one processing device is further configured to correct the ground determination of the gross weight of the aircraft while parked at the aircraft parking bay on the ground before takeoff based on information regarding the relationship stored in the computer memory.

4. The system of claim 1, wherein the at least one processing device is further configured to determine whether the ground determination of the gross weight of the aircraft while parked at the aircraft parking bay on the ground before takeoff falls within an acceptable gross weight range stored in the at least one computer memory, wherein the acceptable gross weight range is determined based on the updated information regarding the relationship between the ground determination of the gross weight of the aircraft while parked at the aircraft parking bay on the ground and the air determination of gross weight of the aircraft while in the air.

5. The system of claim 4, further comprising a human-machine interface communicatively coupled to the at least one processing device; and
    wherein the at least one processing device is further configured to alert an operator of the aircraft through the human-machine interface before takeoff of the aircraft when the ground determination of the gross weight of the aircraft while parked at the aircraft parking bay on the ground before takeoff does not fall within the acceptable gross weight range.

6. The system of claim 1, further comprising a human-machine interface communicatively coupled to the at least one processing device; and
    wherein the at least one processing device is further configured to receive the ground determination of gross weight of the aircraft while parked at the aircraft parking bay on the ground input through the human-machine interface.

7. The system of claim 6, wherein the at least one sensor includes at least one of a pressure sensor, a stress sensor, a torque sensor, a strain gauge, a Surface Acoustic Wave (SAW) sensor, and a piezoelectric sensor mounted on at least one of a strut, an oleo, a hinge, a pivot pin, a trunnion pin, and a resting point on a spar; and
    wherein the information regarding the ground determination of the gross weight of the aircraft while parked at the aircraft parking bay on the ground before takeoff is at least one of weight, pressure, stress, torque, and strain on at least one landing gear of the aircraft.

8. The system of claim 1, further comprising:
wherein the at least one processing device is configured to determine a ground determination of a center of gravity of the aircraft while parked at the aircraft parking bay on the ground before takeoff based on at least one device configured to generate information regarding the ground determination of the center of gravity of the aircraft while parked at an aircraft parking bay on the ground before takeoff;
wherein the at least one processing device is further configured to determine an air determination of the center of gravity of the aircraft in the air after takeoff based on information regarding the air determination of the center of gravity of the aircraft in the air after takeoff from at least one device onboard the aircraft;
wherein the at least one processing device is further configured to determine a second error between the ground determination of the center of gravity of the aircraft while parked at the aircraft parking bay on the ground and the air determination of center of gravity of the aircraft while in the air while taking into account any reduction in gross weight of the aircraft due to fuel consumed since receiving the ground determination of the gross weight of the aircraft parked at the aircraft parking bay on the ground;
wherein the at least one processing device is configured to update information regarding a second relationship between the ground determination of the gross weight of the aircraft while parked at the aircraft parking bay on the ground and the air determination of gross weight of the aircraft while in the air; and
wherein the at least one computer memory is further configured to store the updated information regarding the relationship for use next time the aircraft parks at the aircraft parking bay on the ground.

9. The system of claim 8, wherein the at least one device that provides information regarding the air determination of the center of gravity of the aircraft in the air after takeoff from at least one device onboard the aircraft is a Trimable Horizontal Stabilizer.

10. The system of claim 1, further comprising at least one sensor configured to generate and provide information regarding the ground determination of the gross weight of the aircraft while parked at the aircraft parking bay on the ground before takeoff to the at least one processing device; and
an inertial measurement device configured to determine a static attitude of the aircraft when the ground determination of the gross weight of the aircraft is received while the aircraft is parked at the aircraft parking bay on the ground before takeoff and provide the static attitude to the at least one processing device; and
wherein the at least one processing device is configured to receive a ground determination of the center of gravity of the aircraft while parked at the aircraft parking bay on the ground before takeoff by processing the information regarding the ground determination of gross weight and static attitude of the aircraft while parked at the aircraft parking bay on the ground before takeoff.

11. A method for validating a ground determination of a gross weight of an aircraft against an air determination of gross weight comprising:
generating information regarding a ground determination of gross weight of an aircraft while parked at an aircraft parking bay on the ground before takeoff using at least one sensor;
determining the ground determination of gross weight of an aircraft while parked at an aircraft parking bay on the ground before takeoff based on the information regarding the ground determination of gross weight of the aircraft while parked at the aircraft parking bay on the ground before takeoff generated by the at least one sensor;
determining an air determination of gross weight of the aircraft in the air after takeoff based on an indicated airspeed of the aircraft, an angle of attack of the aircraft, and thrust applied to the aircraft;
determining a first error between the ground determination of the gross weight of the aircraft while parked at the aircraft parking bay on the ground and the air determination of gross weight of the aircraft while in the air while taking into account any reduction in gross weight of the aircraft due to fuel consumed since determining the ground determination of the gross weight of the aircraft parked at the aircraft parking bay on the ground;
updating information regarding a relationship between the ground determination of the gross weight of the aircraft while parked at the aircraft parking bay on the ground and the air determination of gross weight of the aircraft while in the air; and
storing the updated information regarding the relationship in the computer memory for use next time the aircraft parks at the aircraft parking bay on the ground.

12. The method of claim 11, further comprising:
receiving the indicated airspeed of the aircraft from an indicated airspeed sensor;
receiving the angle of attack of the aircraft from an angle of attack sensor; and
receiving the thrust applied to the aircraft from a thrust level output.

13. The method of claim 11, further comprising:
correcting the ground determination of the gross weight of the aircraft while parked at the aircraft parking bay on the ground before takeoff based on information regarding the relationship stored in the computer memory.

14. The method of claim 11, further comprising:
determining whether the ground determination of the gross weight of the aircraft while parked at the aircraft parking bay on the ground before takeoff falls within an acceptable gross weight range stored in a computer memory.

15. The method of claim 11, further comprising:
alerting an operator of the aircraft before takeoff of the aircraft when the ground determination of the gross weight of the aircraft while parked at the aircraft parking bay on the ground before takeoff does not fall within the acceptable gross weight range.

16. The method of claim 11, further comprising:
storing the ground determination of the gross weight of the aircraft while parked at the aircraft parking bay on the ground in a computer memory;
storing the air determination of gross weight of the aircraft while in the air in the computer memory; and
storing the determined error between the ground determination of the gross weight of the aircraft while parked at the aircraft parking bay on the ground and the air determination of gross weight of the aircraft while in the air in the computer memory.

17. The method of claim 11, further comprising:
generate information regarding a ground determination of a center of gravity of the aircraft while parked at an aircraft parking bay on the ground before takeoff using at least one sensor;
determining the ground determination of a center of gravity of the aircraft while parked at the aircraft parking bay on the ground before takeoff based the information regarding the ground determination of center of gravity of the aircraft while parked at the aircraft parking bay on the ground before takeoff;

determining an air determination of the center of gravity of the aircraft in the air after takeoff based on information regarding the air determination of the center of gravity of the aircraft in the air after takeoff from at least one device onboard the aircraft;

determining a second error between the ground determination of the center of gravity of the aircraft while parked at the aircraft parking bay on the ground and the air determination of center of gravity of the aircraft while in the air while taking into account any change in the center of gravity due to at least one of fuel consumed and change in position of landing gear since determining the ground determination of the center of gravity of the aircraft parked at the aircraft parking bay on the ground;

updating information regarding a second relationship between the ground determination of the center of gravity of the aircraft while parked at the aircraft parking bay on the ground and the air determination of center of gravity of the aircraft while in the air; and storing the updated information regarding the second relationship in the computer memory for use next time the aircraft parks at the aircraft parking bay on the ground.

18. The method of claim 17, further comprising:

determining a static attitude of the aircraft while parked at the aircraft parking bay on the ground before takeoff using an inertial measurement device;

providing the static attitude to the at least one processing device; and wherein receiving a ground determination of the center of gravity of the aircraft while parked at the aircraft parking bay includes receiving weight determinations for each landing gear from at least one landing gear sensor and comparing the weight determinations for each landing gear in view of the static attitude of the aircraft while parked at the parking bay on the ground before takeoff to determine the center of gravity of the aircraft.

19. A system for validating a ground determination of a gross weight of an aircraft, the system comprising:

at least one processing device;

at least one computer memory communicatively coupled to the at least one processing device;

at least one human-machine interface communicatively coupled to the at least one processing device;

an inertial measurement device communicatively coupled to the at least one processing device and configured to determine a static attitude of the aircraft while parked at an aircraft parking bay on the ground before takeoff and provide the static attitude to the at least one processing device;

a plurality of sensors configured to generate and provide weight information regarding the weight at each landing gear strut of the aircraft while parked at the aircraft parking bay on the ground before takeoff to the at least one processing device;

an indicated airspeed sensor communicatively coupled to the at least one processing device, the indicated airspeed sensor configured to determine and provide the indicated airspeed of the aircraft while airborne to the at least one processing device;

an angle of attack sensor communicatively coupled to the at least one processing device, the angle of attack sensor configured to determine and provide the angle of attack of the aircraft while airborne to the at least one processing device;

a thrust measurement output communicatively coupled to the at least one processing device, the thrust sensor configured to provide the thrust applied to the aircraft to the at least one processing device;

a Trimable Horizontal Stabilizer communicatively coupled to the at least one processing device, the Trimable Horizontal Stabilizer configured to provide information regarding the center of gravity of the aircraft while airborne to the at least one processing device;

wherein the at least one processing device is configured to determine a ground determination of the gross weight of an aircraft while parked at the aircraft parking bay on the ground before takeoff based on the weight information regarding the weight at each landing gear strut of the aircraft provided by the at least one sensor;

wherein the at least one processing device is further configured to determine a ground determination of the center of gravity of the aircraft while parked at the aircraft parking bay on the ground before takeoff based on the weight information regarding the weight at each landing gear strut of the aircraft provided by the plurality of sensors and the static attitude of the aircraft while parked at an aircraft parking bay on the ground before takeoff provided by the inertial measurement device;

wherein the at least one processing device is further configured to determine an air determination of the gross weight of the aircraft in the air after takeoff based on an indicated airspeed of the aircraft determined by the indicated airspeed sensor, an angle of attack of the aircraft, and thrust applied to the aircraft;

wherein the at least one processing device is further configured to determine a first error between the ground determination of the gross weight of the aircraft while parked at the aircraft parking bay on the ground and the air determination of gross weight of the aircraft while in the air while taking into account any reduction in gross weight of the aircraft due to fuel consumed since receiving the ground determination of the gross weight of the aircraft parked at the aircraft parking bay on the ground;

wherein the at least one processing device is further configured to determine an air determination of the center of gravity of the aircraft in the air after takeoff based on a position of the center of gravity as indicated by a calibrated position of the Trimable Horizontal Stabilizer (THS) referenced to horizontal datum corresponding to a Mean Aerodynamic Chord (MAC) of wings of the aircraft;

wherein the at least one processing device is further configured to determine a second error between the ground determination of the center of gravity of the aircraft while parked at the aircraft parking bay on the ground and the air determination of center of gravity of the aircraft while in the air while taking into account any reduction in gross weight of the aircraft due to fuel consumed since receiving the ground determination of the center of gravity of the aircraft parked at the aircraft parking bay on the ground;

wherein the at least one processing device is further configured to update information regarding a first relationship between the ground determination of the gross weight of the aircraft while parked at the aircraft parking bay on the ground and the air determination of gross weight of the aircraft while in the air based on the first error;

wherein the at least one processing device is further configured to update information regarding a second relationship between the ground determination of the center of gravity of the aircraft while parked at the aircraft parking bay on the ground and the air determination of center of gravity of the aircraft while in the air based on the second error;

wherein the at least one computer memory is configured to store the updated information regarding the first relationship, the updated information regarding the second relationship, the ground determination of the gross weight of the aircraft while parked at the aircraft parking bay on the ground, the static attitude of the aircraft when the ground determination of the gross weight of the aircraft is received while the aircraft is parked at the aircraft parking bay on the ground before takeoff, the ground determination of the center of gravity of the aircraft while parked at the aircraft parking bay on the ground, information identifying the aircraft parking bay when the ground determination of the gross weight of the aircraft is received while the aircraft is parked at the aircraft parking bay on the ground before takeoff, the air determination of gross weight of the aircraft while in the air, the air determination of center of gravity of the aircraft while in the air, the determined error between the ground determination of the gross weight of the aircraft while parked at the aircraft parking bay on the ground and the air determination of gross weight of the aircraft while in the air, and the determined error between the ground determination of the center of gravity of the aircraft while parked at the aircraft parking bay on the ground and the air determination of center of gravity of the aircraft while in the air; and wherein the updated information regarding the first relationship and the updated information regarding the second relationship is used next time the aircraft parks at the aircraft parking bay on the ground.

20. The system of claim 19, further comprising:

wherein the at least one sensor includes at least one of a pressure sensor, a stress sensor, a torque sensor, a strain gauge, a Surface Acoustic Wave (SAW) sensor, and a piezoelectric sensor mounted on at least one of a strut, an oleo, a hinge, a pivot pin, a trunnion pin, and a resting point on a spar; and wherein the information regarding the ground determination of the gross weight of the aircraft while parked at the aircraft parking bay on the ground before takeoff is at least one of weight, pressure, stress, torque, and strain on at least one landing gear of the aircraft.

* * * * *